Patented Aug. 20, 1946

2,406,218

UNITED STATES PATENT OFFICE 2,406,218

REACTION CONDENSATION PRODUCTS OF TERTIARY ALKYL UREAS AND FORMALDEHYDE AND METHODS FOR PRODUCING THE SAME

Mortimer T. Harvey, South Orange, N. J., and Solomon Caplan, New York, N. Y., assignors to Harvel Research Corporation, a corporation of New Jersey No Drawing. Application May 31, 1943, Serial No. 489,194

2 Claims. (Cl. 260—69)

This invention relates to novel compositions of matter and to methods for preparing the same. In its more specific aspect the invention is directed to the organic condensation reaction products obtained by reacting certain amides with formaldehyde and methods for preparing the same.

In the course of our experimentation, we have discovered that organic condensation reaction products may be obtained by reacting formaldehyde with that limited group of amides consisting of the monotertiary alkyl ureas having four to six carbon atoms in the alkyl group. Briefly, the invention comprises heating a mixture of one to six molecular proportions of formaldehyde and one molecular proportion of said monotertiary alkyl ureas to provide an organic condensation reaction product which may be converted to the solid state by heating. In practice, we employ more than 1 mole of formaldehyde and preferably at least two and between two and three moles of formaldehyde for each mole of said monotertiary alkyl ureas in the presence of a small amount of an acidic or basic catalyst to hasten the reaction. This mixture may be heated to boiling and maintained in this state of boiling under a reflux condenser until the organic condensation reaction product is produced. This product may be dried and is soluble in ethyl alcohol, mixtures of butyl alcohol and toluol and other solvents.

For a fuller understanding of the objects and nature of this invention, attention is directed to the following specific examples which are given by way of illustration:

Example 1

| | | |
|---|---|---|
| Tertiary butyl urea | grams | 116 |
| Formaldehyde solution (37½%) | do | 100 |
| Ammonia solution (26°) | cc | 2.7 |

This mixture was refluxed at boiling temperature for one hour and allowed to cool.

Example 2

| | | |
|---|---|---|
| Tertiary butyl urea | grams | 116 |
| Formaldehyde solution (37½%) | do | 160 |
| Ammonia solution (26°) | cc | 2.7 |

This mixture was refluxed at boiling temperature for one hour and allowed to cool.

Example 3

| | | |
|---|---|---|
| Tertiary butyl urea | grams | 116 |
| Formaldehyde solution (37½%) | do | 240 |
| Ammonia solution (26°) | cc | 2.7 |

This mixture was refluxed at boiling temperature for one hour and allowed to cool.

Examples 4, 5 and 6

The above series was repeated but instead of 116 grams of tertiary butyl urea, 130 grams of tertiary amyl urea was used.

Examples 7, 8 and 9

Examples 1, 2 and 3 were repeated but with the use of 144 grams of tertiary hexyl urea instead of the 116 grams of tertiary butyl urea.

Example 10

About 30 grams of mono tertiary butyl urea, 120 cc. of formaldehyde, 40% water solution, and 6 cc. of $NH_4OH$ 28° Baumé were heated to ebullition for about one hour, after which 70 cc. of butyl alcohol and 3 cc. of $H_3PO_4$ were added and the whole heated under a reflux condenser. This material is suitable as a surface coating and as an impregnating medium, and can be set after application by heating at about 270° F. for about fifteen minutes.

These novel products find application in various fields and may be used to provide novel products. We have further discovered that novel products may be obtained by reacting formaldehyde with a mixture of one or more of said mono tertiary alkyl ureas and other compounds such as urea and the like.

These formaldehyde-tertiary alkyl urea organic condensation reaction products hereinbefore described are non-oily and are thick and viscous, like heavy molasses and when added to the normally thin liquid organic condensation reaction products of urea-formaldehyde in water, in the proportion of about 4 parts by weight of the former to about 1 part by weight of the latter, this admixture may be heat converted to a dry and non-tacky solid. A 5 to 10 gram sample of said mixture may be converted to said dry, non-tacky, solid state by heating the same for about two hours at 105° C.

The entire disclosures embodied in our copending applications Serial No. 294,480 filed September 12, 1939, and Serial No. 463,132, filed October 23, 1942, are hereby made part of this application and thus are embodied herein.

This application is a continuation in part of our application 463,132, through 294,480 to our application Serial No. 217,220 filed July 2, 1938.

Having thus described our invention, what we claim and desire to protect by Letters Patent is:

1. The organic condensation reaction product produced by heating a mixture of formaldehyde and a mono tertiary alkyl urea having four to six carbon atoms in the alkyl group, the mole ratio of the former to the latter in said mixture being between about 1–1 and 6–1.

2. The method comprising by the application of heat reacting formaldehyde with a mono tertiary alkyl urea having from 4 to 6 carbon atoms in the alkyl group, the mole ratio of the former to the latter being greater than 1 to 1 and no greater than 6 to 1.

MORTIMER T. HARVEY.
SOLOMON CAPLAN.